(12) United States Patent
Mizuta et al.

(10) Patent No.: US 6,935,453 B2
(45) Date of Patent: Aug. 30, 2005

(54) FOUR-WHEEL-DRIVE VEHICLE

(75) Inventors: Fumio Mizuta, Akashi (JP); Hidetoshi Kaku, Kakogawa (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/836,218

(22) Filed: May 3, 2004

(65) Prior Publication Data

US 2004/0222028 A1 Nov. 11, 2004

(30) Foreign Application Priority Data

May 8, 2003 (JP) ........................................ 2003-130415

(51) Int. Cl.⁷ ............................................ B60K 17/24
(52) U.S. Cl. .................... 180/235; 180/247; 180/62; 180/349
(58) Field of Search ............................ 180/55, 58, 349, 180/62, 235, 418, 245, 246, 247

(56) References Cited

U.S. PATENT DOCUMENTS

| 5,137,106 | A | * | 8/1992 | Allen et al. ................ 180/235 |
| 5,222,574 | A | * | 6/1993 | Miller ........................ 180/379 |
| 5,725,063 | A | * | 3/1998 | Ceragioli et al. .......... 180/14.4 |
| 6,213,490 | B1 | * | 4/2001 | Lykken et al. ............. 280/442 |
| 6,425,452 | B1 | * | 7/2002 | Steiner et al. ............. 180/233 |
| 2002/0170755 | A1 | * | 11/2002 | Cope ........................ 180/14.4 |

FOREIGN PATENT DOCUMENTS

JP          A 3-287406         12/1991

* cited by examiner

*Primary Examiner*—Avraham Lerner
(74) *Attorney, Agent, or Firm*—Oliff & Berridge, PLC

(57) ABSTRACT

A four-wheel-drive vehicle includes: a body frame; a swing unit including a power unit, and a rear axle connected to the power unit so as to be driven by the power unit, the swing unit being supported on the body frame for vertical swing motion; a front reduction gear for transmitting power to front wheels; and a front propeller shaft connecting the power unit to the front reduction gear for power transmission.

14 Claims, 8 Drawing Sheets

FOUR-WHEEL-DRIVE VEHICLE

BACKGROUND OF THE INVENTION

1. Field of the Invention

The present invention relates to a four-wheel-drive vehicle and, more particularly, to a four-wheel-drive vehicle suitable for running at a low running speed on the rough-terrain ground, such as an agricultural working vehicle or a truck.

2. Description of the Related Art

A common four-wheel-drive vehicle for use on the rough-terrain ground is provided with rear axles supported by a swing arm suspension. The swing arm suspension absorbs the vertical movement of the rear wheels caused by the rough surface of the ground. The power unit including an engine, a transmission and such, of the four-wheel-drive vehicle having the swing arm suspension, is mounted on a body frame. The power unit mounted on the body frame is connected to a front reduction gear (or a front differential) for driving the front wheels by a front propeller shaft and to a rear reduction gear (or a rear differential) for driving the rear wheels by a rear propeller shaft.

When the power unit, including the engine, the transmission and such, is mounted on the body frame, the power unit is inevitably disposed at a position in the front half of the vehicle, such as a position under the driver's seat. Consequently, vibrations generated by the engine are transmitted readily to the driver seated on the driver's seat and a narrow space is available around the driver, and therefore ride comfort is deteriorated.

The rear propeller shaft connecting the power unit mounted on the body frame to the rear reduction gear suspended on a swing frame of the swing arm suspension for vertical swinging motion is supported so as to swing vertically together with the swing frame. Consequently, the rear propeller shaft causes power loss greater than that caused by the front propeller shaft. Since load on the rear wheel is large when the four-wheel-drive vehicle is a truck that carries a heavy load on a rear part thereof, the power loss caused by the rear propeller shaft affect adversely to the working economy, such as fuel economy, of the four-wheel-drive vehicle.

SUMMARY OF THE INVENTION

In order to solve the above-mentioned problems, a four-wheel-drive vehicle according to the present invention comprises: a body frame; a swing unit including a power unit, and a rear axle connected to the power unit so as to be driven by the power unit, the swing unit being supported on the body frame for vertical swing motion; a front reduction gear for transmitting power to front wheels; and a front propeller shaft connecting the power unit to the front reduction gear for power transmission.

In this construction, a space in a rear part of the four-wheel-drive vehicle, such as a space under a load-carrying platform, can be effectively used for accommodating the power unit. Therefore, the four-wheel-drive vehicle can be formed in compact construction, a wide space is available around the driver's seat and operating devices, and satisfactory ride comfort is ensured for the driver.

Further, since the power unit and the rear axle are united in the swing unit, the position of the rear axle relative to the power unit remains unchanged regardless of the swing motion of the swing unit. Consequently, power loss that occurs in transmitting power to the rear axle can be reduced and thereby the working economy, such as fuel economy, of the four-wheel-drive vehicle can be improved.

Preferably, the front propeller shaft is provided with a universal joint in a middle of the front propeller shaft.

This constitution increases the degree of freedom of disposition of the front propeller shaft. Namely, since the universal joint permits the front propeller shaft to bend, the front propeller shaft can be disposed in a desired space.

Preferably, a center of the universal joint is located so as to substantially coincide with a pivotal point of the swing unit with respect to longitudinal and vertical directions.

In this constitution, the front propeller shaft is able to swing smoothly about the center of the universal joint in vertical directions when the swing unit swings, and thereby power loss that occurs in transmitting power to a front axle of the vehicle can be reduced.

Preferably, the front propeller shaft is supported by a bearing of a bearing housing at a middle of the front propeller shaft, the bearing housing being held by a holding part which is formed integrally with a cross pipe of the body frame.

In this constitution, the height of the front propeller shaft can be determined without taking the disturbance by the cross pipe into consideration. Therefore, the degree of freedom of disposing the front propeller shaft increases and the rigidity of the cross pipe can be enhanced.

Preferably, a drive selecting mechanism for selecting either two-wheel drive or four-wheel drive is built in the bearing housing.

The drive selecting mechanism built in the bearing housing, as compared with a drive selecting mechanism built in the transmission, can be disposed near a drive selector lever disposed on a control panel or at a position within the reach of the driver's hand. Therefore, the drive selecting mechanism and the drive selector lever can be interlocked by a short cable, the response of the drive selecting mechanism to a drive selecting operation of the driver can be improved, and the short cable facilitates work for arranging the cable.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

FIGS. 1 to 6 shows an all-terrain four-wheel-drive vehicle in an embodiment according to the present invention intended for use as an agricultural truck.

Body Structure

Figure 1:
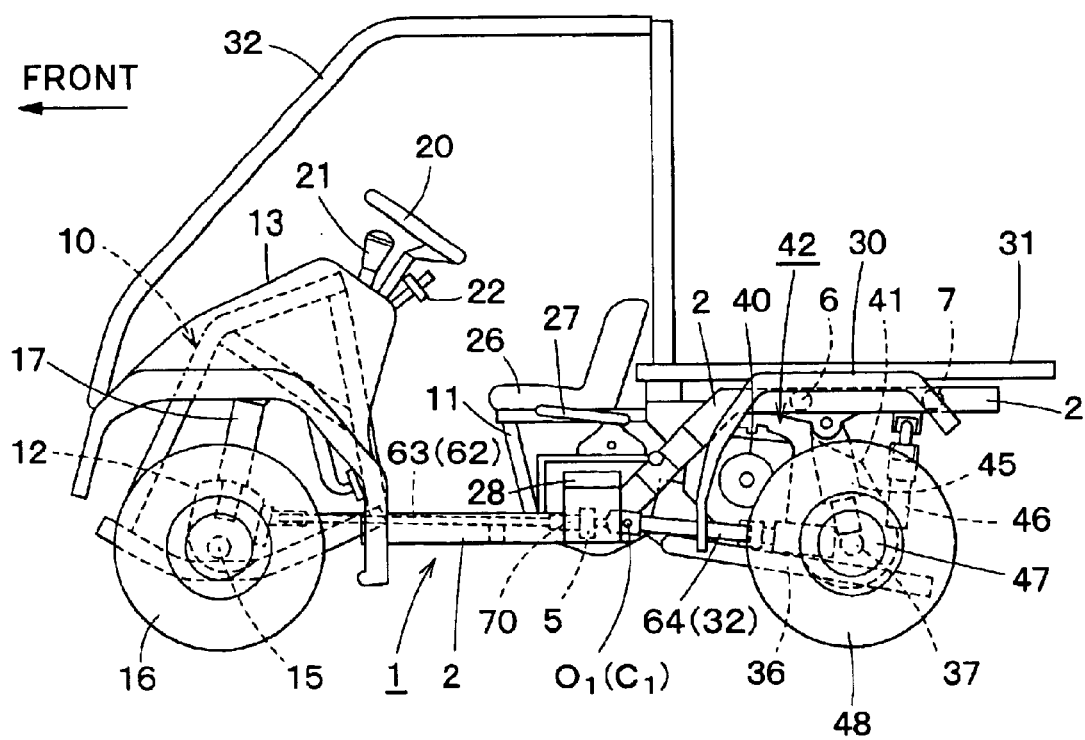
FIG. 1 is a side elevation of a four-wheel-drive vehicle in a first embodiment according to the present invention taken from the left side thereof.

Referring to FIG. 1, a body frame 1 of the vehicle has longitudinal right and left square pipes 2 forming a main frame. Cross pipes 5, 6 and 7 extend transversely between the square pipes 2 to connect the square pipes 2. The square pipes 2 have bends in middle parts thereof, and rear parts of the square pipes 2 extend obliquely upward toward the rear from the bends. A front frame 10 forming a front part of the body frame 1 is joined to the front ends of the square pipes 2. A steering wheel 20, a shift lever 21 for operating a transmission, and a drive selector lever 22 for two wheel drive and four wheel drive are arranged around the upper end of the front frame 10. A front cover 13 is attached to the front frame 10. A seat support frame 11 is fixedly built into middle parts of the square pipes 2. A seat 26 for a driver is attached to the top of the seat support frame 11.

A front reduction gear case 12 containing a differential, not shown, is mounted on a lower end part of the front frame 10. Front axles 15 project transversely from the front reduction gear case 12. The front axles 15 are suspended by front shock absorbers 17. The front wheels 16 are connected to the front axles 15 by knuckle arms, not shown, so as to be steerable.

A side brake lever 27 and a battery 28 are arranged beside the seat 26.

A load-carrying platform 31 is placed on and attached to the rear parts of the square pipes 2. Rear fenders 30 are attached to the rear parts of the square pipes 2. A cabin frame 32 for covering the driver is extended between the front end of the front frame 10 and a part behind the seat 26 so as to define a passenger compartment.

The cross pipe 5 lying directly below the seat 26 supports a swing frame 36 for turning about a center $O_1$ of swing motion. The swing frame 36 extends rearward. Rear axles 37 are supported on the swing frame 36. A power unit 42 including an engine 40 and a transmission 41 is mounted on the swing frame 36.

Figure 4:
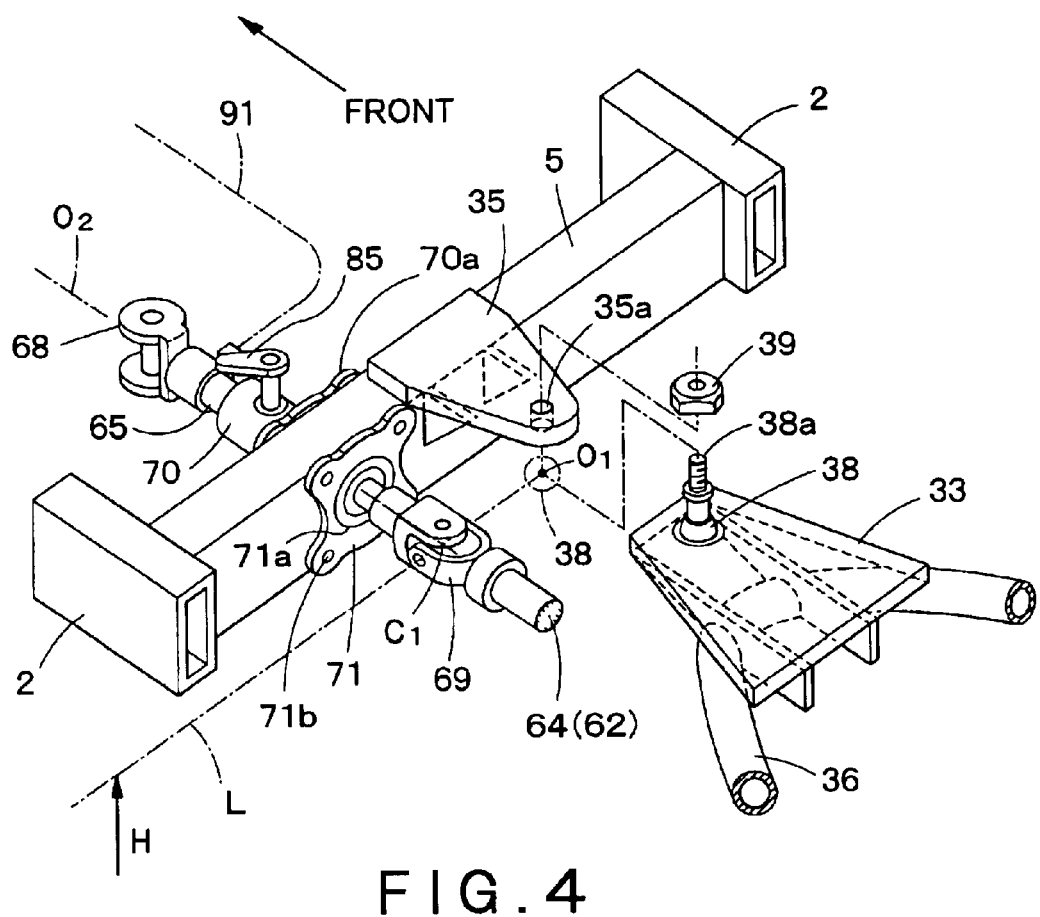
FIG. 4 is an exploded perspective view of a cross pipe, a front part of a swing frame and the associated parts in the four-wheel-drive vehicle in FIG. 1.

Referring to FIG. 4, showing a front part of the swing frame 36, the cross pipe (cross beam) 5 and the associated parts in an exploded perspective view, a flat bracket 33 is welded to a front end part of the swing frame 36 so as to project forward. A spherical joint 38, such as a pillow ball joint, is built in the bracket 33. A bracket 35 is welded so as to project rearward to the upper surface of a middle part of the cross pipe 5 lying directly below the seat 26. A threaded projection 38*a* included in the spherical joint 38 is passed upward through a hole 35*a* formed in the bracket 35, and a nut 39 is screwed on a threaded part of the threaded projection 38*a* to support the swing frame 36 for turning on the bracket 35.

Figure 3:
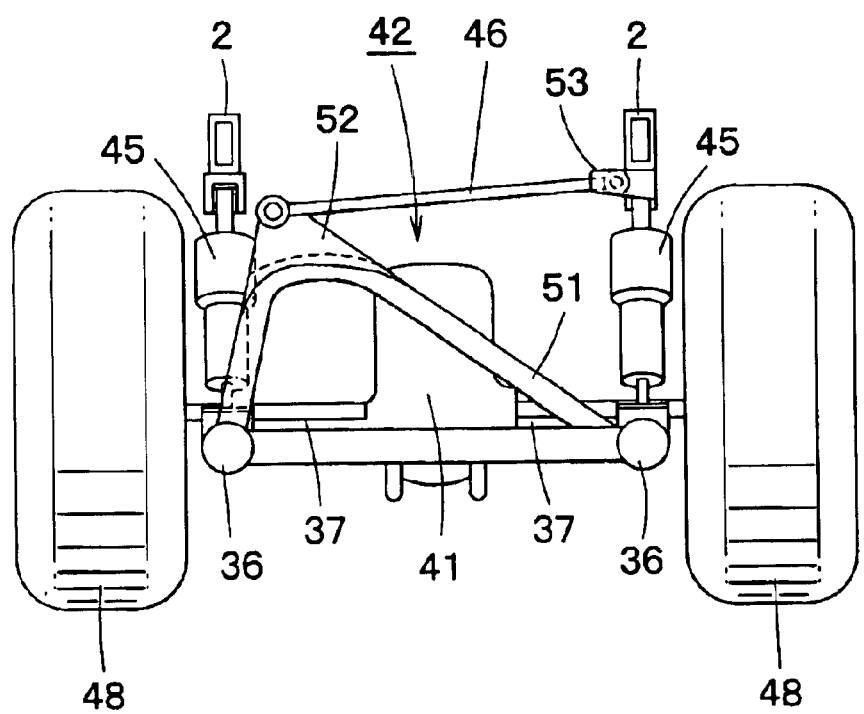
FIG. 3 is a rear view of the body frame and the power transmission system shown in FIG. 2.

Referring to FIG. 3 showing the swing frame 36 in a rear view, the swing frame 36 is suspended by right and left rear shock absorbers 45. The transverse movement of the swing frame 36 is limited to a predetermined range by a swing limiting link 46. A curved pipe 51 having an upward convex shape is welded to the rear end of the swing frame 36. The top of the curved pipe 51 is nearer to the left side of the swing frame 36. The swing limiting link 46 has one end pivotally connected by a pin to a bracket 53 attached to the right square pipe 2 and the other end pivotally connected by a pin to a bracket 52 attached to the top of the curved pipe 51 to limit the transverse swing of the swing frame 36 within the predetermined range.

Power Plant and Transmission System

Figure 2:
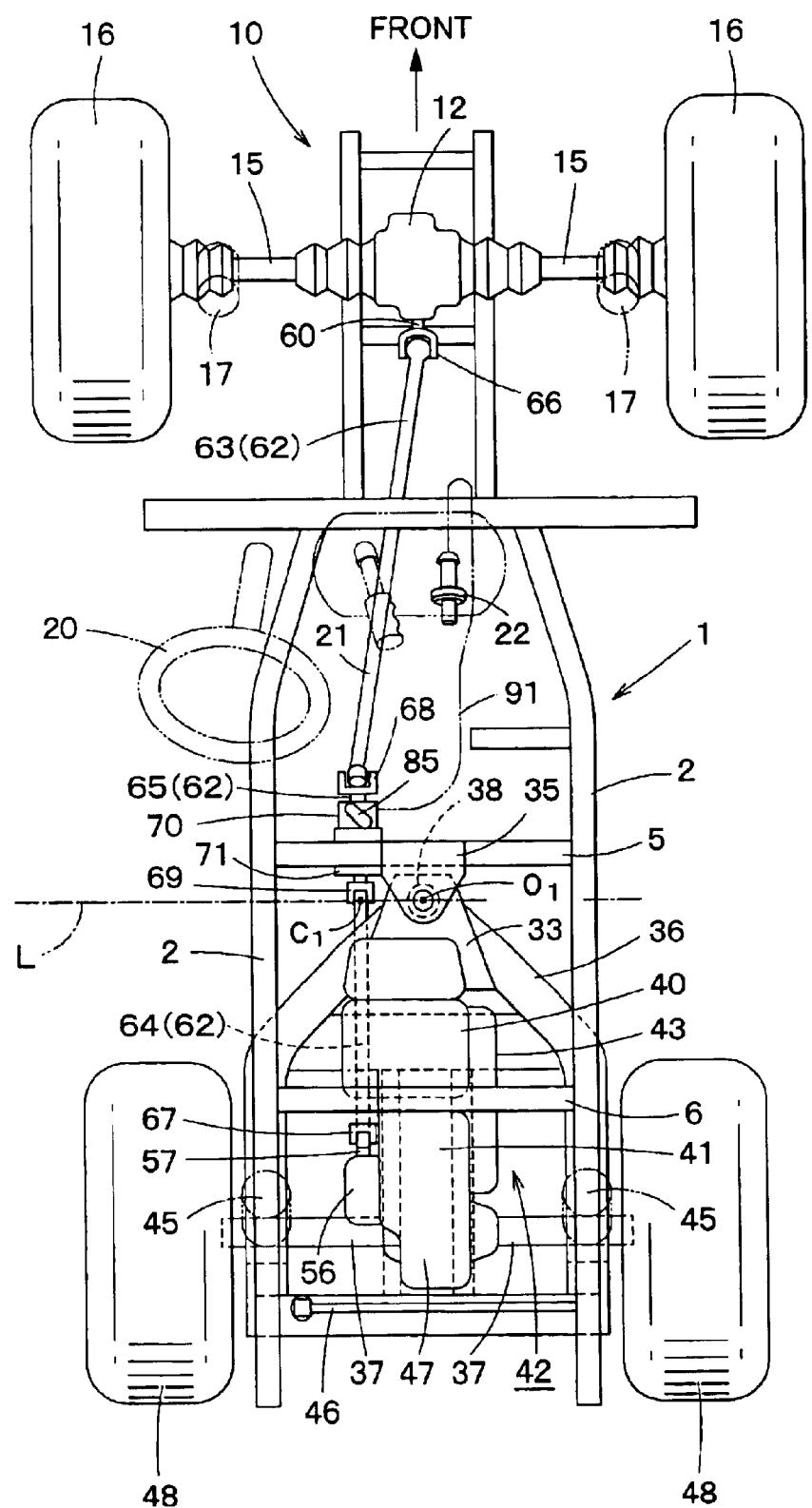
FIG. 2 is a plan view of a body frame and a power transmission system included in the four-wheel-drive vehicle shown in FIG. 1.

Referring to FIG. 2 showing the body frame 1, the swing frame 36 and a power transmission system in a plan view, the swing frame 36 is formed in a longitudinally elongated pentagonal shape having a substantially triangular front part. The engine 40 is mounted on a front part of the swing frame 36. A transmission 41 is disposed behind the engine 40 and interlocked with the engine 40 by, for example, a belt drive device 43 on the right side of the engine 40 and the transmission 41. A rear differential case 47 is attached to a lower rear part of the transmission 41. A transfer 56 is attached to the left side wall of the transmission 41. A front wheel drive shaft 57 projects forward from the transfer 56. The rear axles 37 projects transversely from the differential case 47. Rear wheels 48 are connected to the rear axles 37 by couplings or the like, not shown. Thus, the power unit 42 including the engine 40 and the transmission 41 is mounted on the swing frame 36 in addition to the rear axles 37 and the rear wheels 48 so as to construct a swing unit, which is able to swing vertically, including the power unit 42, the rear axles 37 and the rear wheels 48.

A front propeller shaft 62 connects the front wheel drive shaft 57 to an input shaft 60 included in a front reduction gear contained in the front reduction gear case 12. The front propeller shaft 62 is a three-piece shaft including a front member 63, a rear member 64 and a middle member 65. The front member 63 has a front end connected to the input shaft 60 of the front reduction gear contained in the front reduction gear case 12 by a universal joint 66. The rear member 64 has a rear end connected to the front wheel drive shaft 57 of the transmission 47 by a universal joint 67. The middle member 65 is supported in a bearing held in a bearing housing 70 attached to a part of the cross pipe 5 directly below the seat 26. The front and the rear ends of the middle member 65 are connected to the front member 63 and the rear member 64 by universal joints 68 and 69, respectively.

Figure 5:
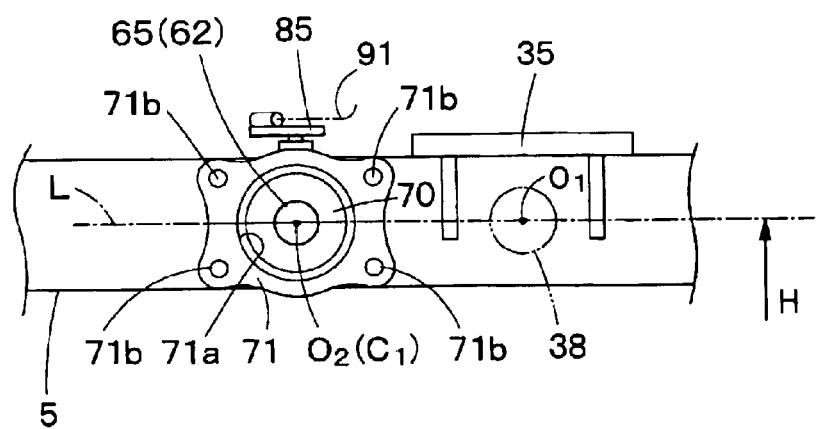
FIG. 5 is a rear view of the cross pipe shown in FIG. 4.

Referring to FIG. 5 showing the cross pipe 5 in a rear view, a mounting plate 71 for holding the bearing housing 70 is welded to a part, on the left side of the bracket 35, of the rear wall of the cross pipe 5. The mounting plate 71 is provided in its central part with a bearing housing receiving opening 71*a* in which the bearing housing 70 is fitted, and threaded holes 71*b* in its four corners. The vertical position of the mounting plate 71 is determined such that the center axis of the bearing housing receiving hole 71*a* aligned with a center axis $O_2$ of the middle member 65 of the front propeller shaft 62 supported in the bearing held in the bearing housing 70 is within the height of the cross pipe 5 and at the substantially the same height H as the center of the ball of the spherical joint 38 coinciding with the center $O_1$ of swing motion of the swing frame 36.

Referring to FIG. 4 which is an exploded perspective view of a cross pipe, as mentioned above, the center axis $O_2$ of the middle member 65 is set at the same height H as the center of the ball of the spherical joint 38 coinciding with the center $O_1$ of swing motion. Moreover, a center $C_1$ of the universal joint 69 coincides with the center $O_1$ of swing motion of the swing frame 36 with respect to longitudinal and vertical directions. Consequently, the rear member 64 of the front propeller shaft 62 and the swing frame 36 swing about the same axis L.

The cross pipe 5 employed in this embodiment is a square pipe having a rectangular cross section. Such a shape of the cross pipe 5 facilitates attaching the mounting plate 71 to the cross pipe 5 and mounting the bearing housing 70 on the mounting plate 71.

Bearing Housing Holding Structure

Figure 6:
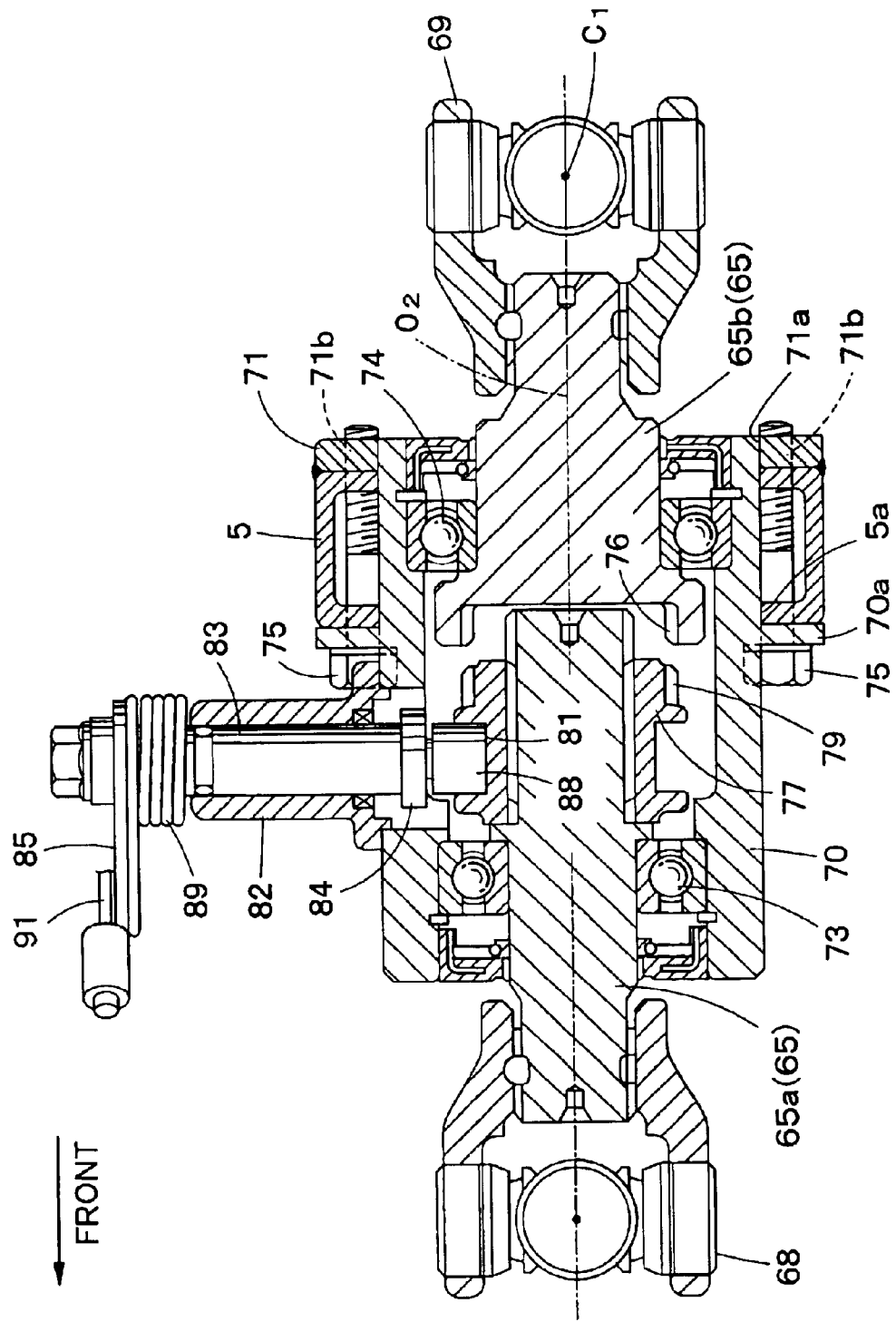
FIG. 6 is an enlarged longitudinal sectional view of a bearing housing shown in FIG. 1.

FIG. 6 is an enlarged longitudinal sectional view of the cross pipe 5, the bearing housing 70 and the associated parts. The cross pipe 5 is provided with a longitudinal bearing housing receiving hole 5a. The axis of the bearing housing receiving hole 5a is aligned with the axis $O_2$ of the bearing housing receiving hole 71a of the mounting plate 71. A part provided with the bearing housing receiving hole 5a of the cross pipe 5 and the mounting plate 71 form a bearing housing holding structure.

The bearing housing 70 has a cylindrical body, and a flange 70a formed integrally with the cylindrical body. The bearing housing 70 is fitted through the front end of the bearing housing receiving hole 5a in the bearing housing receiving hole 5a so that the flange 70a rests on the front wall of the cross pipe 5. The flange 70a is provided with bolt holes in its four corners. Bolts 75 are passed from the front ends of the bolt holes of the flange 70a so as to extend rearward through holes formed in the cross pipe 5 and are screwed in the threaded holes 71b of the mounting plate 71 to fasten the bearing housing 70 to the cross pipe 5.

Bearings 73 and 74 are fitted in front and rear parts of the bearing housing 70, respectively. The middle member 65 of the front propeller shaft 62 is a two-piece shaft consisting of an input part 65b on the rear side, and an output part 65b on the front side. The input part 65b is supported for rotation in the rear bearing 74, and the output part 65a is supported for rotation in the front bearing 73.

A front part of the input part 65b is expanded to form an expanded part provided with internal teeth 76. A drive selector sleeve 77 is splined to a rear part of the output part 65a. The drive selector sleeve 77 is able to move axially on the output part 65a. The drive selector sleeve 77 is provided with external teeth 79 capable of engaging with the internal teeth 76.

A shifting shaft 83 for shifting the drive selector sleeve 77 is held perpendicularly to the axis of the middle member 65 by a boss 82 fixed to the bearing housing 70. The shifting shaft 83 can turn in the boss 82. An inner lever 84 and an outer lever 85 are fastened to an inner end part and an outer end part, respectively, of the shifting shaft 83. A drive pin 88 is attached eccentrically with respect to the shifting shaft 83 to the free end of the inner lever 84. The drive pin 88 is engaged in an annular groove 81 formed in the outer surface of the drive selector sleeve 77. The outer lever 85 is pressed to a two-wheel-drive position by a return coil spring 89. A cable 91 is connected to the outer lever 85.

A drive selecting mechanism includes the drive selector sleeve 77. Normally, the return spring 89 holds the drive selector sleeve 77 through the drive pin 88 at the two-wheel-drive position, i.e., a front position as viewed in FIG. 6. In this state, the output part 65a is disengaged from the input part 65b to set the drive selecting mechanism for two-wheel drive. The cable 91 is pulled to turn the shifting shaft 83 against the resilience of the return spring 89 so that the drive pin 88 shifts the drive selector sleeve 77 to a four-wheel drive position, i.e., a rear position as viewed in FIG. 6. Consequently, the external teeth 79 of the drive selector sleeve 77 are engaged with the internal teeth 76 of the input part 65b to transmit power from the input part 65b to the output part 65a.

As shown in FIG. 2, the cable 91 of the drive selecting mechanism is extended longitudinally from the drive selecting mechanism through a space between the square pipes 2 to a position in front of the control panel provided in front of the passenger compartment, is extended upward and is connected to the drive selector lever 22.

Two-wheel Drive

The drive selector lever 22 shown in FIG. 2 is moved to the two-wheel drive position to select two-wheel drive. Then, the output part 65a of the middle member 65 is disengaged from the input part 65b of the same.

Referring to FIG. 2, when the middle member 65 is set in the state for two-wheel drive, the output power of the engine 40 is transmitted through the belt drive device 43 to the transmission 41, through the transmission 41 and the rear differential contained in the rear differential case 47 and the rear axles 37 to the rear wheels 48. On the other hand, the front wheel drive shaft 57 is disconnected from the rear member 64 by the middle member 65, and hence no power is transmitted to the front wheels 16.

Four-wheel Drive

The drive selector lever 22 shown in FIG. 2 is moved to the four-wheel drive position to select four-wheel drive. Then, the drive selector sleeve 77 is shifted to a four-wheel drive position through the cable 91, the outer lever 85, the shifting shaft 83, the inner lever 84 and the drive pin 88 to engage the input part 65b and the output part 65a of the middle member 65.

Referring to FIG. 2, when the middle member 65 is thus set in the state for four-wheel drive, the output power of the engine 40 is transmitted through the belt drive device 43 to the transmission 41, through the transmission 41 and the rear differential contained in the rear differential case 47 and the rear axles 37 to the rear wheels 48. On the other hand, power is transmitted from the front wheel drive shaft 57 to the rear member 64 of the middle member 65, further through the middle member 65, the front member 63, the front reduction gear contained in the front reduction gear case 12 and the front axles 15 to the front wheels 16.

Referring to FIG. 1, the power unit 42, the rear axles 37 and the rear wheels 48 move vertically together with the swing frame 36 about the center $O_1$ of swing motion while the four-wheel-drive vehicle is running. At the same time, the rear member 64 of the front propeller shaft 62 swings vertically. Since the longitudinal position and the height of the center $C_1$ of the universal joint 69 connecting the rear member 64 and the middle member 65 of the front propeller shaft 62 coincide with those of the center $O_1$ of swing motion of the swing frame 36, the rear member 46 of the front propeller shaft 62 is not unnecessarily strained during swing motions. Consequently, the reduction of the efficiency of power transmission to the front wheels 16 can be avoided, and the swing frame 36 is able to exercise its shock-absorbing ability properly.

The bearing housing 70 containing the drive selecting mechanism is disposed near the driver's seat 26. Therefore, the cable 91 connecting the drive selecting mechanism to the drive selector lever 22 may be short, the response of the drive selecting mechanism to a drive selecting operation can be improved, and the short cable 91 facilitates work for arranging the cable 91.

The bearing housing 70 is extended through and is fixedly held on the cross pipe 5 to increase the rigidity of the cross pipe 5. Since the degree of freedom of determining the position, particularly, the height, of the middle member 65 of the front propeller shaft 62 is increased, the middle member 65 can be extended through the cross pipe 5 as shown in FIG. 5, which contributes to constructing the four-wheel-drive vehicle in compact construction. The cross pipe 5 having the rectangular cross section facilitates welding the mounting plate 71 to the cross pipe 5 and fastening the flange 70a of the bearing housing 70 to the cross pipe 5.

The four-wheel-drive vehicle shown in FIGS. 1 to 6 is provided with the bearing housing 70 containing the drive selecting mechanism. The four-wheel-drive vehicle may be provided with a bearing housing 90 shown in FIGS. 7 and 8 not containing any mechanism corresponding to the drive selecting mechanism. When the four-wheel-drive vehicle is provided with the bearing housing 90, a drive selecting mechanism may be built in the transmission or the four-wheel-drive vehicle may have full-time four-wheel drive.

Figure 8:
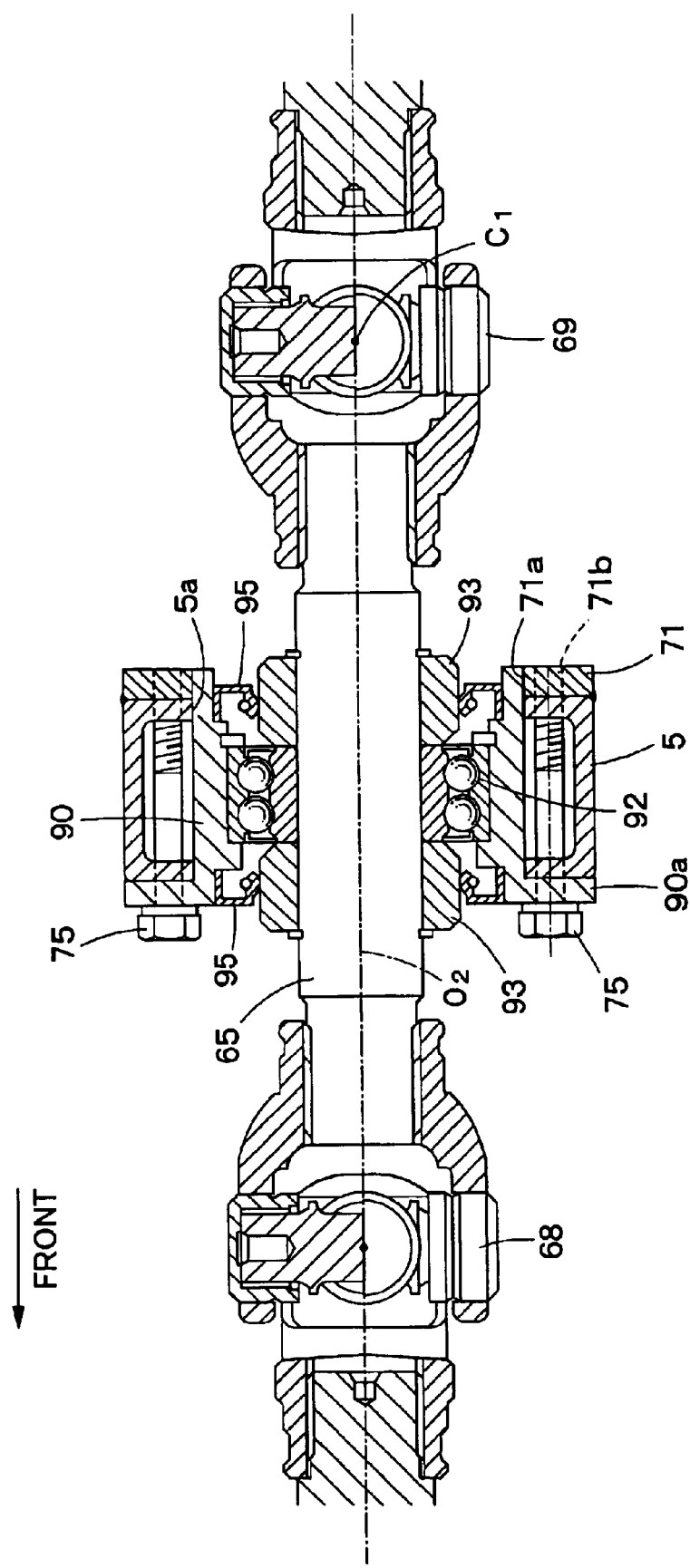
FIG. 8 is an enlarged longitudinal sectional view of a bearing housing shown in FIG. 7.

Referring to FIG. 8, the bearing housing 90 has a cylindrical body, a front flange 90a formed integrally with the body. The body of the bearing housing 90 is inserted through the front end of the bearing housing receiving hole 5a into the same so that the front flange 90a rests on the front wall of the cross pipe 5. Bolts 75 are passed from the front ends of bolt holes formed in the four corners of the flange front 90a so as to extend rearward through holes formed in the cross pipe 5 and are screwed in the threaded holes 71b of the mounting plate 71 to fasten the bearing housing 90 to the cross pipe 5.

A double-row ball bearing 92 held in the bearing housing 90 supports the middle member 65 of the front propeller shaft 62 for rotation. Stopper collars 93 are mounted on the middle member 65 contiguously with the double-row ball bearing 92, and are retained in place by retaining rings to locate the double-row ball bearing 92 on the middle member 65. Spaces between the stopper collars 93 and the bearing housing 91 are sealed by seals 95.

Figure 7:
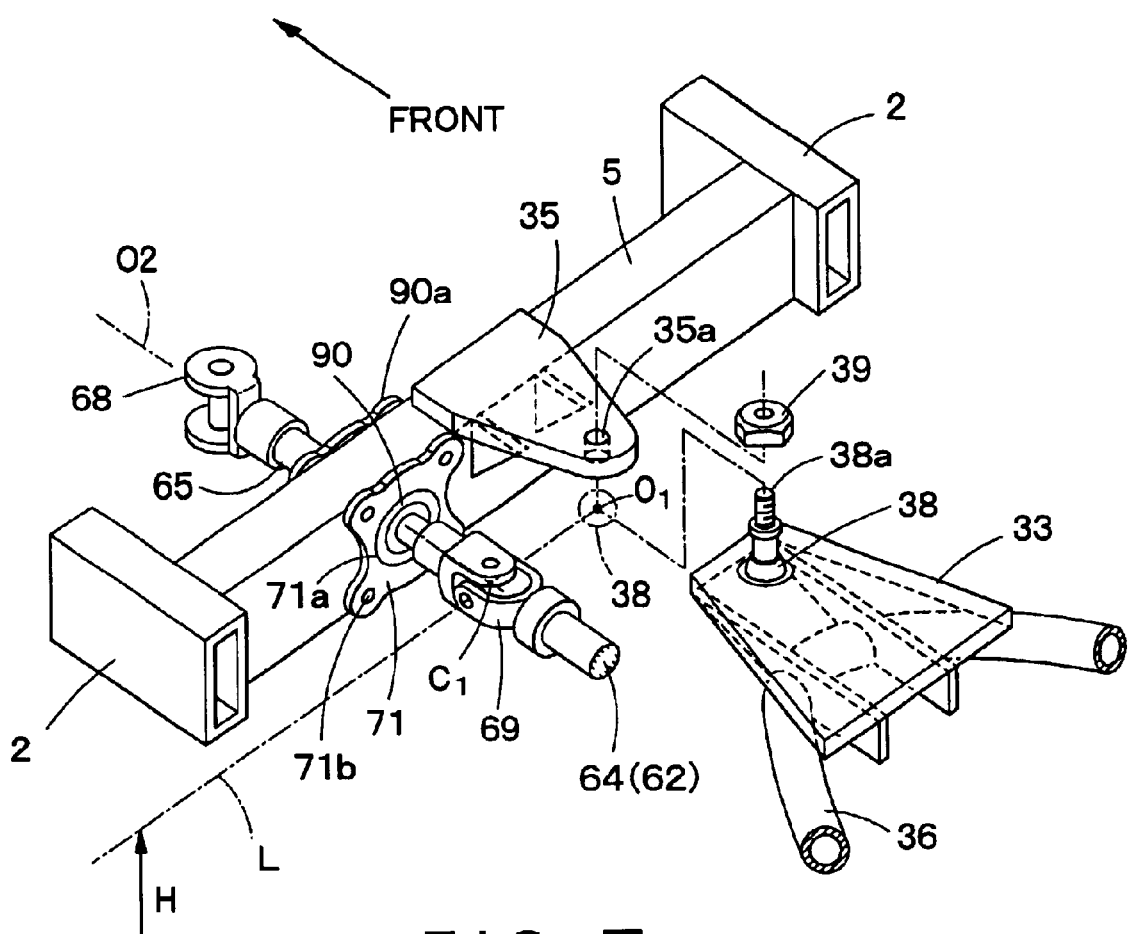
FIG. 7 is an exploded perspective view, similar to FIG. 4, of a front part and the associated parts included in a four-wheel-drive vehicle in another embodiment according to the present invention.

Referring to FIG. 7, the middle member 65 of the front propeller shaft 62 is held, similarly to the middle member 65 shown in FIG. 4, such that the axis $O_2$ of the middle member 65 is at the same height H as the center $O_1$ of the ball of the spherical joint 38. Thus, center C1 of the universal joint 69 connecting the rear member 64 and the middle member 65 of the front propeller shaft 62 is at the same height H as the center $O_1$ of the ball of the spherical joint 38. The longitudinal position of the center $C_1$ of the universal joint 69 is the same as that of the center $O_1$ of the ball of the spherical joint 38. Thus, the center $C_1$ of the universal joint 69 coincides with the center $O_1$ about which the swing frame 36 swings with respect to longitudinal and vertical directions. Consequently, the rear member 64 of the front propeller shaft 62 swings up and down together with the swing frame 36 about the center axis L as viewed from a horizontal direction.

The swing frame 36 may be supported for swing motion about the axis of a horizontal swing frame support shaft instead of supporting the same on the spherical joint 38.

The present invention is not limited in its practical application to the agricultural truck described herein; the present invention is applicable to various all-terrain four-wheel-drive vehicles provided with a swing frame like that mentioned above including working vehicles for agricultural uses and civil engineering works.

Moreover, the cross pipe 5 may be a round pipe.

Figure 9:
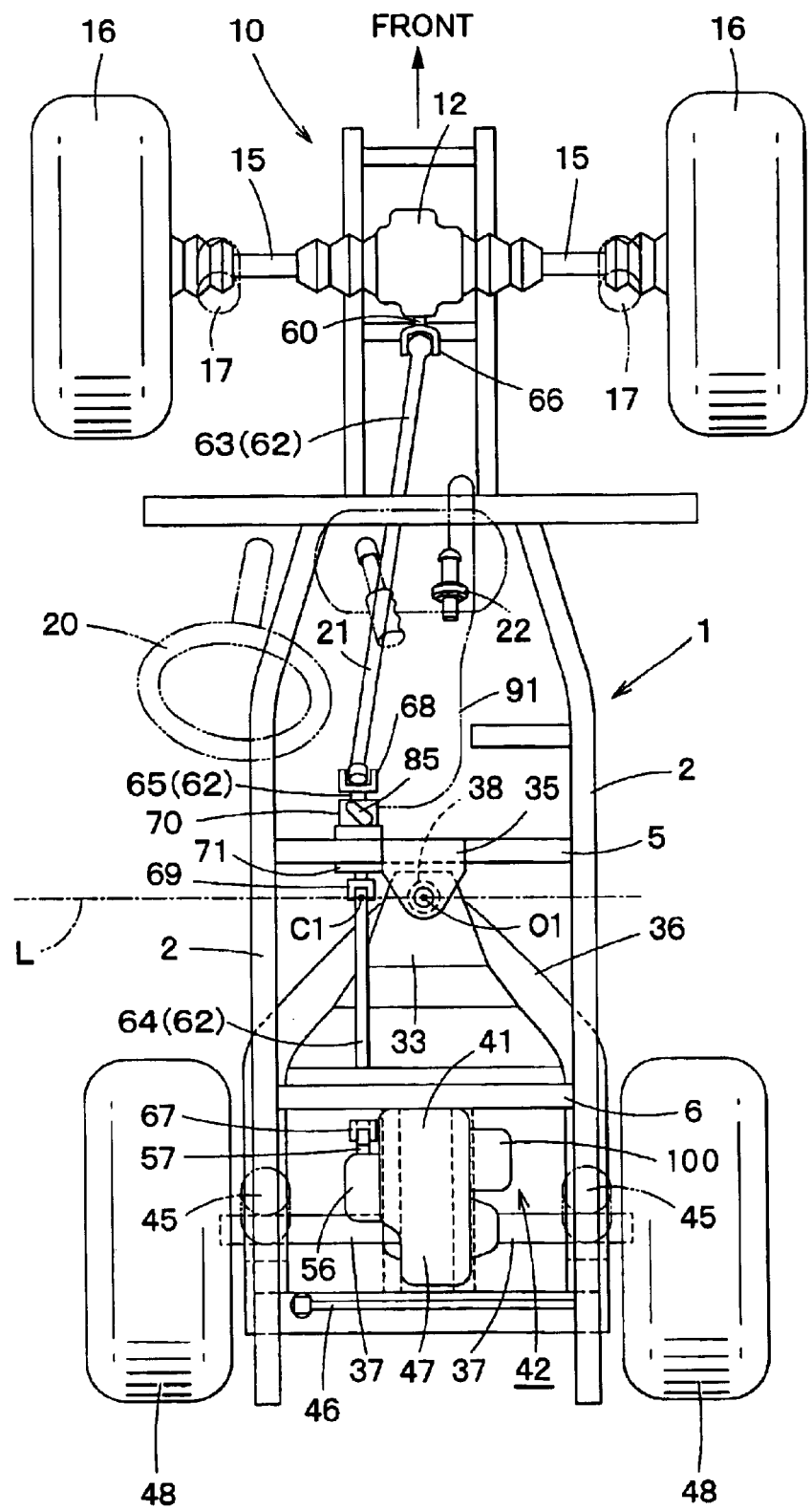
FIG. 9 is a plan view, similar to FIG. 2, of a power unit in a modification.

A power unit 42 including an electric motor 100 instead of the engine 40 may be mounted on the swing frame 36 as shown in FIG. 9. The electric motor 100 may be provided with an output shaft transversely projecting in opposite directions, respectively, and directly connected to the right and the left rear axles, and may be operatively connected to a transfer for transmitting power to the front wheels.

The swing frame 36 may be omitted. Alternatively, an engine and a transmission may be united to form a unitary power unit, the power unit may be supported for swing motion on the body frame, and the rear axles may be connected to the output shaft of the transmission 41.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A four-wheel-drive vehicle comprising:
   a body frame;
   a swing unit including a power unit, and a rear axle, the rear axle connected to the power unit so as to be driven by the power unit, the swing unit being supported on the body frame for vertical swing motion so that the swing unit can vertically swing about a horizontal axis with respect to the body frame;
   a front reduction gear for transmitting power to front wheels; and
   a front propeller shaft connecting the power unit to the front reduction gear for power transmission.

2. The four-wheel-drive vehicle according to claim 1, wherein the front propeller shaft is provided with a universal joint in a middle of the front propeller shaft.

3. The four-wheel-drive vehicle according to claim 2, wherein a center of the universal joint is located so as to substantially coincide with a pivotal point of the swing unit with respect to longitudinal and vertical directions.

4. The four-wheel-drive vehicle according to claim 1, wherein the front propeller shaft is supported by a bearing of a bearing housing at a middle of the front propeller shaft, the bearing housing being held by a holding part that is formed integrally with a cross pipe of the body frame.

5. The four-wheel-drive vehicle according to claim 4, wherein a drive selecting mechanism for selecting either two-wheel-drive or four-wheel-drive is built into the bearing housing.

6. The four-wheel-drive vehicle according to claim 1, wherein the swing unit is swingably connected to the body frame via a spherical joint at a center of a body of the vehicle in a lateral direction so that the swing unit can swing vertically.

7. The four-wheel-drive vehicle according to claim 6, wherein the front propeller shaft extends in a longitudinal direction so as to pass a point laterally shifted from a center of the spherical joint.

8. The four-wheel drive vehicle according to claim 4, wherein the front propeller shaft includes a middle member supported on the body frame via the bearing of the bearing house, a rear member connected to the middle member at one end to the power unit at an other end via a universal joint, and front member connected to the middle member at one end and to the front reduction gear at an other end via a universal join.

9. The four-wheel-drive vehicle according to claim 1, further comprising a shock absorber supporting the swing unit to the body frame in a direction the vertical swing motion.

10. The four-wheel-drive vehicle according to claim 1, wherein a driver's seat is mounted on the body frame.

11. The four-wheel-drive vehicle according to claim 1, wherein the front reduction gear is mounted on the body frame.

12. The four-wheel-drive vehicle according to claim 1, wherein the power unit and the rear axle are mountedly supported by the swing unit such that the position of the rear axle relative to the power unit remains unchanged regardless of vertical wing motion of the swing unit.

13. A four-wheel-drive vehicle comprising:
   a body frame;
   a swing unit including a power unit and a rear axle connected a the power unit so as to be driven by the power unit, the swing unit being supported on the body frame for vertical swing motion;
   a front reduction gear for transmitting power to front wheels; and
   a front propeller shaft connecting the power unit to the front reduction gear for power transmission,
   wherein the front propeller shaft is provided with a universal joint in a middle of the front propeller shaft, and
   wherein a center of the universal joint is located so as to substantially coincide with a pivotal point of the swing unit with respect to longitudinal and vertical directions.

14. A four-wheel-drive vehicle comprising:
   a body frame;
   a swing unit including a power unit and a rear axle connected to the power unit so as to be driven by the power unit, the swing unit being supported on the body frame for vertical swing motion;
   a front reduction gear for transmitting power to front wheels; and
   a front propeller shaft connecting the power unit to the front reduction gear for power transmission,
   wherein the front propeller shaft is supported by a bearing of bearing housing at a middle of the front propeller shaft, the bearing housing being held by a holding part that is formed integrally with a cross pipe of the body frame, and
   wherein a drive selecting mechanism for selecting either two-wheel-drive or four-wheel-drive is built into the bearing housing.

* * * * *